(12) United States Patent
Bates et al.

(10) Patent No.: US 7,835,232 B2
(45) Date of Patent: Nov. 16, 2010

(54) METHOD TO ERASE DATA STORED ON BLU-RAY DISC

(75) Inventors: Allen K. Bates, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

(21) Appl. No.: 11/426,769

(22) Filed: Jun. 27, 2006

(65) Prior Publication Data

US 2007/0297311 A1    Dec. 27, 2007

(51) Int. Cl.
*G11B 7/00*     (2006.01)
(52) U.S. Cl. .................................. 369/13.04; 369/275.2
(58) Field of Classification Search ........................ None
See application file for complete search history.

(56) References Cited

U.S. PATENT DOCUMENTS

| | | | |
|---|---|---|---|
| 4,599,718 A | 7/1986 | Nakagawa et al. | |
| 4,630,249 A * | 12/1986 | Braat et al. ............... | 369/13.28 |
| 4,970,711 A | 11/1990 | Martin et al. | |
| 5,113,387 A | 5/1992 | Goldsmith et al. | |
| 5,144,613 A | 9/1992 | Johnson et al. | |
| 5,319,481 A * | 6/1994 | Fergason ..................... | 349/171 |
| 6,822,937 B2 | 11/2004 | Tsukagoshi et al. | |
| 2002/0064122 A1* | 5/2002 | Kato et al. ............. | 369/112.23 |
| 2004/0208088 A1 | 10/2004 | Nakayama et al. | |
| 2007/0230302 A1* | 10/2007 | Chen ........................ | 369/53.16 |
| 2007/0297311 A1* | 12/2007 | Bates et al. ................. | 369/100 |

FOREIGN PATENT DOCUMENTS

| | | |
|---|---|---|
| JP | 61214146 A | 9/1986 |
| JP | 2126448 A | 5/1990 |
| JP | 11085855 A | 3/1999 |

\* cited by examiner

*Primary Examiner*—Van N Chow
(74) *Attorney, Agent, or Firm*—Cantor Colburn LLP; Kurt Goudy

(57) ABSTRACT

A method to erase data stored on an erasable optical recording system is provided. The optical recording system includes a laser IO head having a blue-light laser, a red-light laser, and an infrared-light laser writing data on the blu-ray disc, the DVD disc, and CD disc, respectively. The method includes indexing the infrared-light laser of the laser IO head one track of the blu-ray disc every 0.4 revolutions after first 0.8 revolutions, to erase the data stored on the blu-ray disc.

12 Claims, 2 Drawing Sheets

METHOD TO ERASE DATA STORED ON BLU-RAY DISC

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a method to erase data stored on an optical recording medium and, more particularly, to a method to erase data stored on a blu-ray disc by indexing an infrared-light laser one track every 0.4 revolutions of the disc.

2. Description Of Background

An optical recording medium records and reproduces data by using a laser beam. Blu-ray Disc (BD) for example, is an optical disc format meant for storage of high-definition video and high-density data. A single-layer BD can store enough for approximately four hours of high-definition video with audio. A dual-layer BD can hold enough for approximately eight hours of High Definition (HD) video. Capacities of 100 GB and 200 GB, using four and eight layers respectively, are currently being researched. Blu-ray systems use a blue-light laser operating at a wavelength of 405 nm, similar to the one used for High Definition Digital Versatile Disk (HD-DVD), to read and write data. DVDs and CDs use red-light and infrared-light lasers at 650 nm and 780 nm respectively.

A bulk erase has been used for performing a polarization or an initialization and a sensitivity shift of the optical recording medium. For example, a semiconductor laser for a DVD drive may have a peak beam power of approximately 150 milliwatts (mW) and the beam makes a mark on the media along the tangential direction of varying lengths, this mark having a diametral axis of approximately 0.4 µm in the radial direction of a disc. The rotating disc is irradiated with the laser beam by focusing only on the recording film to raise the temperature of the recording film. Erasing DVD, and hence Blu-Ray, currently requires that each track be erased with the same laser beam used to write the information, a process which only allows one track to be erased at a time, or one track per revolution of the disk. However, there is a need for a faster and economic erase method of an optical recording medium, namely one which erases an entire track for a fraction of a revolution of the disk.

SUMMARY OF THE INVENTION

The shortcomings of the prior art are overcome and additional advantages are provided through a method to erase data stored on a blu-ray disc by using an infrared-light laser.

According to one aspect of the present application, a method to erase data stored on an erasable optical recording system is provided. A laser 10 (input output) head has at least two lasers, each of a different wavelength. In the case of blu-ray this laser IO head has 3 lasers, a blue-light laser, a red-light laser, and an infrared-light laser to write data on a blu-ray disc, a DVD disc, and a CD disc, respectively. The erase method for blu-ray includes indexing the infrared-light laser of the laser IO head one track of the blu-ray disc every 0.4 revolutions after first 0.8 revolutions, to erase the data stored on the blu-ray disc.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution by adopting an infrared-light laser to erase data stored on a blu-ray disc.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
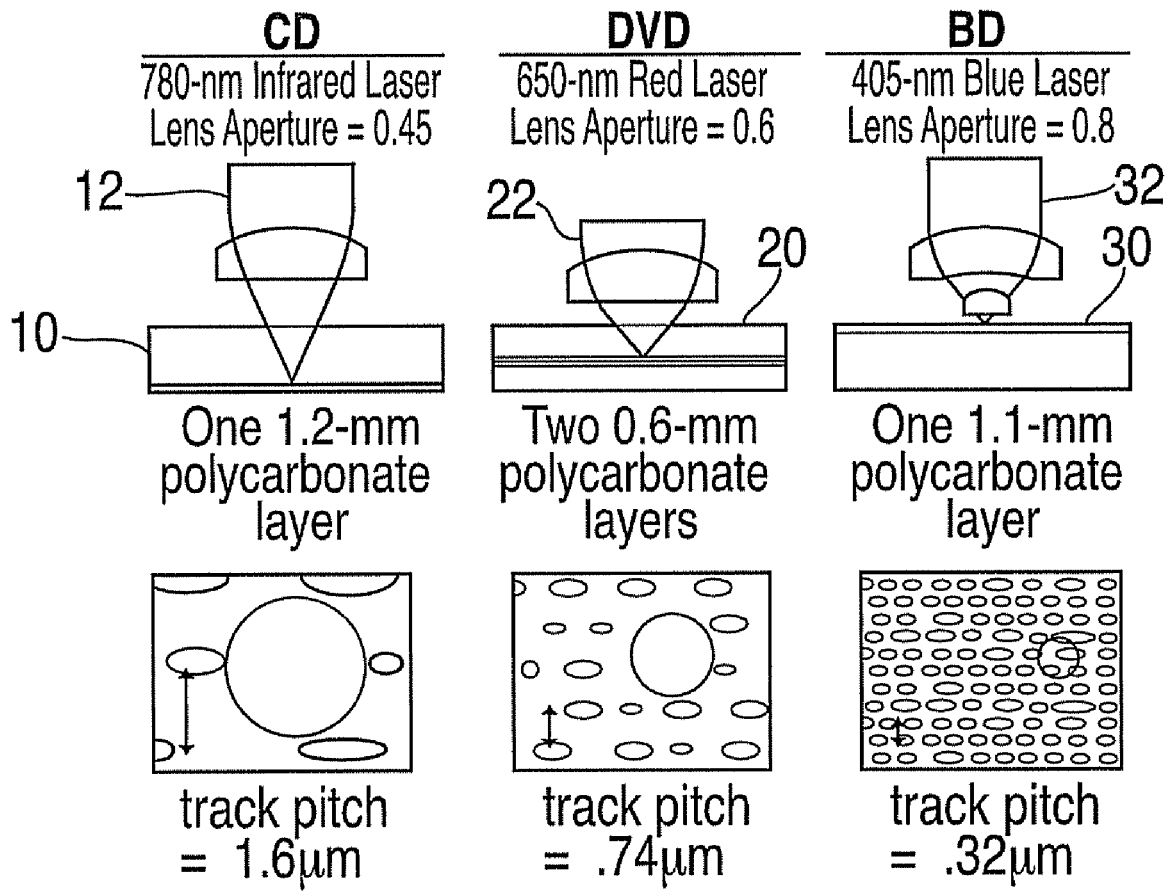
FIG. 1 illustrates writing to a CD disc, DVD disc, and blu-ray disc with infrared-light, red-light, and blue-light lasers, respectively.

FIG. 1 illustrates writing data to a CD disc 10, DVD disc 20, and blu-ray disc 30 with infrared-light 12, red-light 22, and blue-light 32 lasers, respectively. As shown in FIG. 1, the blu-ray disc places the data on top of a 1.1-mm-thick polycarbonate layer by using a blue-light laser with a wavelength of 405 nm, a power of 120 mW, and lens aperture of 0.8. The track pitch of the blu-ray disc is 0.32 µm, and the spot size of the blue-light laser is 0.16 µm. In DVD, data is placed on top of two 0.6-mm polycarbonate layers by a red-light laser with a wavelength of 650 nm, a power of 150 mW, and lens aperture of 0.6. The track pitch of the DVD disc is 0.74 µm and the spot size of the red-light laser is 0.4 µm. In CD, data is placed on one 1.2 mm polycarbonate layer by using an infrared-light laser with a wavelength of 780 nm, a power of 200 mW, and lens aperture of 0.45. The track pitch of the CD disc is 1.6 µm and the spot size of the infrared-light laser is 0.8 µm.

Figure 2:
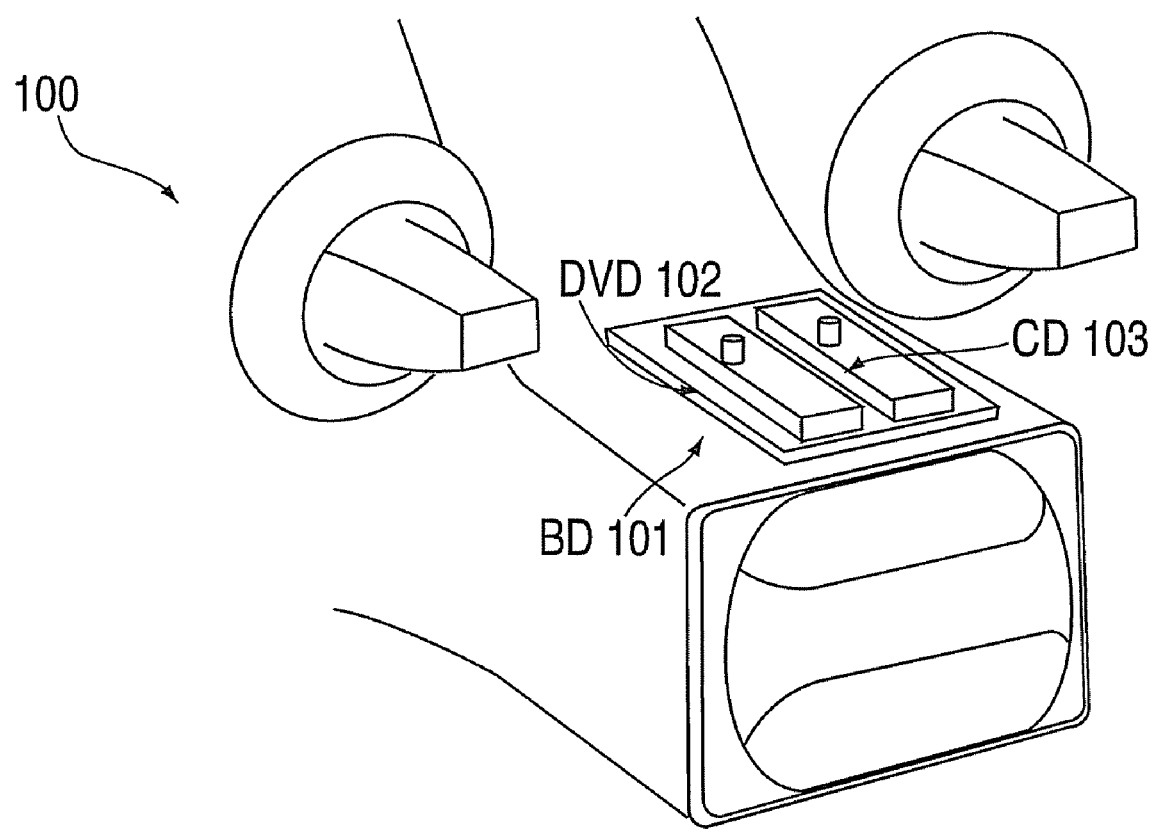
FIG. 2 illustrates one example of a laser 10 head with a plurality lasers of different wavelengths that is used for a method according to the present invention.

Referring to FIG. 2, a blu-ray optical recording system includes a laser 10 head 100 having a blue-light laser 101, a red-light laser 102, and an infrared-light laser 103, so that a blu-ray optical recording system can access blu-ray disks, as well as be backwards compatible with DVD and CD disks. The blue-light laser 101, a red-light laser 102, and an infrared-light laser 103 are used to write data on a blu-ray disc, DVD disc and CD disc, respectively. One embodiment of this invention is that the infrared laser 103 is used to erase blu-ray discs, rather than the blue laser 101. For example, by use of the infrared-light laser 103 of the laser 10 head 100 to erase the blu-ray disk allows the larger spot size of 0.8 µm to erase more data than the spot size of 0.16 µm of blue laser 101. Because of this larger spot size, the bulk erase process covers up to five times more area (0.8/0.16), which allows indexing of the infrared-light from the laser IO head 100 one track every 0.2 (0.16/0.8) revolutions to 0.4 revolutions to erase/ destruct the data stored on the blu-ray disc. To insure the initial data is erased, this indexing starts after the first 0.4 to 0.8 revolutions of the disk, to insure that the very first track will be completely erased.

Because the infrared-light laser is already used for writing data on the CD disc, no additional laser is necessary for erasing data on the blu-ray disc. Further, because the spot size of the infrared-light laser is 0.8 μm, which is 2.5 times bigger (0.8/0.32) than the 0.32 μm of the track pitch of the blu-ray disc, the erase/destruction of data stored on the blu-ray disc is performed at a speed of 2.5 times faster that that of a conventional erase method. Thus, the preferred implementation is that the infrared light is indexed one track every 0.4 revolutions, after rotating the disk 0.8 revolutions at the start of the erase. Therefore, according to embodiments of the present invention, a faster and economical erasing of the data stored on the blu-ray disc is achieved.

There is value of pre-erasing data from blu-ray RAM disks, to delete all vestiges of the old data, in order to improve the signal-to-noise ratio of blu-ray RAM disks. For blu-ray WORM disks, destruction of the data is important. Embodiments of the invention permit the erase/destruction of the recorded data at a rate 2.5 times faster than possible with the blue laser. Embodiments of the invention also lengthen the life of the blue-laser 101, by not using it for bulk erase/destruction of data.

While the preferred embodiment to the invention has been described, it will be understood that those skilled in the art, both now and in the future, may male various improvements and enhancements which fall within the scope of the claims which follow. These claims should be construed to maintain the proper protection for the invention first described.

What is claimed is:

1. A method to erase data stored on an erasable optical recording system, the optical recording system comprising an IO head having a first wavelength laser and a second wavelength laser for input/output (IO) to an optical disk, the wavelength of said second laser is longer than the wavelength of said first laser, the method comprising:

indexing an infrared-light laser of the IO head one track of the optical disc every X revolutions after first 2X revolutions, to erase data stored on the optical disk, where X is a ratio of the track pitch of the optical disk divided by a spot size of the second laser.

2. The method according to claim 1, wherein said first laser comprises a blue-light laser, and said second laser comprises an infrared-light laser.

3. The method according to claim 2, wherein said optical disk is a blu-ray disk.

4. The method according claim 3, wherein the spot size of said infrared laser is 2.5 times bigger than the track pitch of said blu-ray disc.

5. The method according to claim 3, wherein the spot size of said infrared-light laser is 0.8 μm, and the track pitch of said blu-ray disc is 0.32 μm.

6. A method to erase data stored on an erasable optical recording system, the optical recording system comprising an IO head having a first wavelength laser and a second wavelength laser for input/output (IO) to an optical disk, the wavelength of said second laser is longer than the wavelength of said first laser, the method comprising:

indexing an infrared-light laser of the IO head one track of the optical disc every X revolutions after first 2X revolutions, to erase data stored on the optical disk, where X ranges between (i) a ratio of a track pitch of the optical disk divided by a spot size of the second laser and (ii) a ratio of a spot size of the first laser divided by the spot size of the second laser.

7. The method according to claim 6, wherein said first laser comprises a blue-light laser, and said second laser comprises an infrared-light laser.

8. The method according to claim 7, wherein said optical disk is a blu-ray disk.

9. The method according claim 8, wherein the spot size of said infrared laser is 2.5 times bigger than the track pitch of said blu-ray disc.

10. The method according to claim 8, wherein the spot size of said infrared-light laser is 0.8 μm, and the track pitch of said blu-ray disc is 0.32 μm.

11. The method according claim 8, wherein the spot size of said infrared laser is 5 times bigger than the spot size of said blue laser.

12. The method according to claim 8, wherein the spot size of said infrared-light laser is 0.8 μm, and a track pitch of said blu-ray disc is 0.16 μm.

* * * * *